United States Patent
Sakamoto et al.

(10) Patent No.: US 6,168,864 B1
(45) Date of Patent: **\*Jan. 2, 2001**

(54) MULTILAYER COATING FILM

(75) Inventors: Hiroyuki Sakamoto, Kobe; Ichiro Kawakami, Takatsuki; Takao Saito, Toyonaka, all of (JP)

(73) Assignee: Nippon Paint Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/358,846

(22) Filed: Jul. 22, 1999

(30) Foreign Application Priority Data

Jul. 22, 1998 (JP) .................... 10-206521
Dec. 28, 1998 (JP) .................... 10-372490

(51) Int. Cl.$^7$ ...................... B32B 27/38
(52) U.S. Cl. ............ 428/413; 428/414; 428/416; 428/418; 523/414; 525/502; 525/529
(58) Field of Search .................... 205/170, 317, 205/220, 229; 428/413, 414, 416, 418, 520, 522; 525/502, 529, 530, 531; 523/414

(56) References Cited

U.S. PATENT DOCUMENTS

| 3,959,106 | * | 5/1976 | Bosso et al. ............... 204/181 |
| 4,463,111 |   | 7/1984 | Kuwajima et al. .......... 523/414 |
| 5,446,084 | * | 8/1995 | Huemke et al. ............ 524/504 |

OTHER PUBLICATIONS

WPI/Derwent AN 1992–004560 and JP 03 2588565 A, Nov. 19, 1991, Abstract.

\* cited by examiner

*Primary Examiner*—Paul Thibodeau
*Assistant Examiner*—Christopher Paulraj
(74) *Attorney, Agent, or Firm*—Pollock, Vande Sande & Amernick

(57) ABSTRACT

A multilayer coating film which comprises:

a cationic electrodeposition coat formed from an epoxy-based cationic electrocoating composition containing 5 to 300 millimoles of sulfonium group and 50 to 2,000 millimoles of carbon-carbon unsaturated bond per 100 g of the resin solid content, with carbon-carbon triple bond accounting for at least 15% of said carbon-carbon unsaturated bond; and a top coat formed thereon.

7 Claims, No Drawings

MULTILAYER COATING FILM

FIELD OF THE INVENTION

The present invention relates to a multilayer coating film in particular suited for two-coat coating of automobiles.

PRIOR ART

Automotive coating films generally have the multilayer structure as comprised of an electrodeposition coat, an intermediate coat and a top coat. These multilayer coating films require at least three coating steps. The so-called "two-layer coating" in which said intermediate coating step is omitted is being put into practical use as an economically advantageous process for solid color top coating of cars for commercial use, light cars, trucks and the like.

However, it has been pointed out that when, in this two-coat coating process with the intermediate coating step being omitted, a top coat is formed directly on an electrodeposition coat, the phenomenon of peeling may possibly occur at the interface between the electrodeposition coat and the top coat.

This is considered to be due to the following phenomenon: in the case of ordinary multilayer coating films formed from an electrodeposition coat, an intermediate coat and a top coat, light rays which have entered the coating film are intercepted by the intermediate coat and can hardly penetrate further into the depth, but in the case of multilayer coating films having no intermediate coat, light rays that have entered the coating film can partly reach the electrodeposition coat and cause photodegradation of the electrodeposition coat surface. This phenomenon is remarkable in the case of blue-based pale solid colors and metallic colors, which show high light transmissivity.

Generally, the addition of an ultraviolet absorber or light stabilizer or the like means is employed to prevent ultraviolet degradation of coating films. However, photodegradation of such an additive itself or release thereof from the coating film with the lapse of time results in lessening of the ultraviolet degradation preventing effect, so that the durability of the effect is not so satisfactory.

Accordingly, it is urgently demanded that the multilayer coating film in particular having no intermediate coat show improved weather resistance as the whole multilayer coating film including an electrodeposition coat.

SUMMARY OF THE INVENTION

In view of the current situation mentioned above, the present invention has its primary object to provide a multilayer coating film whose electrodeposition coat can show increased weather resistance to secure sufficient weather resistance as a whole despite no intermediate coat, without allowing the interfacial peeling phenomenon between the top coat and the electrodeposition coat.

The present invention provides a multilayer coating film which comprises:

a cationic electrodeposition coat formed from an epoxy-based cationic electrocoating composition containing 5 to 300 millimoles of sulfonium group and 50 to 2,000 millimoles of carbon-carbon unsaturated bond per 100 g of the resin solid content, with carbon-carbon triple bond accounting for at least 15% of said carbon-carbon unsaturated bond; and a top coat formed thereon.

DETAILED DESCRIPTION OF THE INVENTION

The multilayer coating film of the present invention comprises a cationic electrodeposition coat formed from an epoxy-based cationic electrocoating composition, and a top coat formed thereon. Said cationic electrodeposition coat is formed by electrodeposition of said epoxy-based cationic electrocoating composition, followed by baking for curing. Said top coat is formed by application of a top coating composition, followed by baking for curing.

The epoxy-based cationic electrocoating composition (hereinafter referred to as "the above cationic electrocoating composition" for short), which is to be used in the formation of the multilayer coating film of the present invention, contains sulfonium group and carbon-carbon unsaturated bond.

Said sulfonium group is a hydratable functional group in the above cationic electrocoating composition. When applying a voltage or current at or above a certain level during the electrocoating process, the sulfonium group undergoes electrolytic reduction on an electrode, whereupon the ionic group disappears to form a sulfide, so that it can irreversibly become nonconductor, as illustrated below. It can be considered that owing to this fact the above cationic electrocoating composition displays a high level of throwing power.

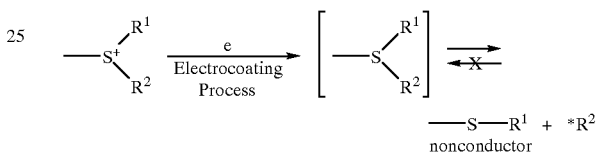

It can also be considered that, during this electrocoating process, electrode reaction is induced and the resulting hydroxide ion is kept by the sulfonium group, thus electrolytically generating a base in the electrodeposition coat. This electrolytically generated base can convert the propargyl group occurring in the electrodeposition coat, which has low thermal reactivity, to allene bond, which has high thermal reactivity.

The sulfonium group content is 5 to 300 millimoles per 100 g of the resin solid content of the above cationic electrocoating composition. When it is less than 5 millimoles per 100 g, sufficient throwing power or curability cannot be obtained and, further, the hydratability and bath stability will be poor. When it is above 300 millimoles per 100 g, the deposition of coats on the surface of articles becomes poor. A preferred range is 10 to 250 millimoles, more preferably 10 to 150 millimoles, per 100 g of the resin solid content of the above cationic electrocoating composition.

Said carbon-carbon unsaturated bond is carbon-carbon double bond or triple bond. This carbon-carbon unsaturated bond may occur terminally in the molecule of the basic resin of the above cationic electrocoating composition, or somewhere within the molecular chain constituting the skeleton of said basic resin. Said carbon-carbon unsaturated bond functions as a curing functional group and can also lead to improvement in weather resistance. The definite reason therefor is not so clear. However, it is conceivable that it shows radical trapping action against radicals formed in the coating film. When it coexists with sulfonium group, it can improve the throwing power of the above cationic electrocoating composition further, although the reason is not known.

The content of said carbon-carbon unsaturated bond is 50 to 2,000 millimoles per 100 g of the resin solid content of the above cationic electrocoating composition. When it is less than 50 millimoles per 100 g, sufficient weather resistance or curability cannot be obtained and the throwing power will also be insufficient. When it is above 2,000 millimoles per 100 g, the hydration stability will be adversely affected when used as a cationic electrocoating composition and the deposition of coats on the surface of articles will become poor. A preferred range is 80 to 1,000 millimoles, more preferably 80 to 500 millimoles, per 100 g of the resin solid content of the above cationic electrocoating composition.

At least 15%, in number, of said carbon-carbon unsaturated bond should be accounted for by carbon-carbon triple bond. This condition is critical since the curability and weather resistance become insufficient when the carbon-carbon triple bond is less than 15%, in number, of the carbon-carbon unsaturated bond.

For example, even when introducing a compound having a plurality of carbon-carbon double bonds per molecule, such as a long-chain unsaturated fatty acid, the content of the carbon-carbon unsaturated bond is expressed in terms of the content of said compound itself having a plurality of carbon-carbon double bonds. This is because even if a compound having a plurality of carbon-carbon double bonds per molecule is introduced, substantially only one carbon-carbon double bond among them is presumably involved in radical trapping or curing reactions, rather than the plurality of carbon-carbon double bonds being equally involved.

The above cationic electrocoating composition is of the epoxy type. In the present specification, the term "epoxy type" means that the basic resin of the electrocoating composition has a skeleton of epoxy resin. Said epoxy resin is not particularly restricted but is preferably a polyepoxide having at least two epoxy groups per molecule so that the sulfonium group and/or the carbon-carbon unsaturated bond can easily be introduced into the resin skeleton. Said polyepoxide is not particularly restricted but can include, for example, epi-bis type epoxy resins, modifications thereof derived by chain elongation with a diol, dicarboxylic acid or diamine, etc; epoxidized polybutadiene; novolak phenol-type polyepoxy resins; novolak cresol-type polyepoxy resins; poly(glycidyl acrylate); poly(glycidyl ether)s of aliphatic polyols or polyether polyols; poly(glycidyl ester)s of polybasic carboxylic acids and the like. Among these, novolak phenol-type polyepoxy resins, novolak cresol-type polyepoxy resins and poly(glycidyl acrylate) are preferred because of ease of polyfunctionalization.

The polyepoxide mentioned above preferably has a number average molecular weight of 500 to 20,000. When the number average molecular weight is less than 500, the coating efficiency of the cationic electrodeposition is poor. When it exceeds 20,000, good coats cannot be formed on the surface of articles. A more preferred number average molecular weight range can be established according to the resin skeleton. In the case of novolak phenol-type epoxy resins and novolak cresol-type epoxy resins, for instance, a molecular weight of 700 to 5,000 is more preferred.

The introduction of the sulfonium group and carbon-carbon unsaturated bond into the above epoxy resin can advantageously be carried out, for instance, by subjecting a compound or compounds having a functional group reactive with epoxy and having carbon-carbon unsaturated bond to react with the epoxy resin so that the proportion of the carbon-carbon triple bond relative to the total carbon-carbon unsaturated bond may fall within the range specified above, to thus introduce this carbon-carbon unsaturated bond, and further by introducing sulfonium group into the remaining epoxy groups.

The compound having a functional group reactive with epoxy and having carbon-carbon unsaturated bond may be, for example, a compound having both a functional group reactive with epoxy, such as a hydroxyl or carboxyl group, and carbon-carbon unsaturated bond. As specific examples, there may be mentioned compounds having hydroxyl or carboxyl group and carbon-carbon triple bond, such as propargyl alcohol, propargylic acid, etc.; compounds having hydroxyl group and carbon-carbon double bond, such as 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol, methallyl alcohol, etc.; compounds having carboxyl group and carbon-carbon double bond, such as acrylic acid, methacrylic acid, ethacrylic acid, crotonic acid, maleic acid, phthalic acid, itaconic acid, etc.; half esters such as maleic acid ethyl ester, fumaric acid ethyl ester, itaconic acid ethyl ester, succinic acid mono(meth)acryloyloxyethyl ester, phthalic acid mono(meth)acryloyloxyethyl ester, etc.; synthetic unsaturated fatty acids such as oleic acid, ricinolic acid, etc.; natural unsaturated fatty acids such as linseed oil and soybean oil, and the like.

Carbon-carbon unsaturated bond-containing epoxy resins can also be obtained by other methods than the method mentioned above, for example by copolymerizing a monomer having carbon-carbon unsaturated bond within the molecule, for example a monomer prepared by addition reaction of propargyl alcohol to glycidyl methacrylate, with some other copolymerizable monomer.

The sulfonium introduction can be carried out, for example, by subjecting a sulfide/acid mixture to react with epoxy group in said resin for sulfide introduction and sulfonium conversion, or by introducing a sulfide and then converting this sulfide to a sulfonium by reaction with an acid or an alkyl halide such as methyl fluoride or methyl iodide, if necessary followed by anion exchange. From the viewpoint of ready availability of reactants, the method using a sulfide/acid mixture is preferred.

Said sulfide is not particularly restricted but can include, among others, aliphatic sulfides, aliphatic-aromatic mixed sulfides, aralkyl sulfides and cyclic sulfides. More specifically, there may be mentioned, for example, diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, 1-(2-hydroxyethylthio)-3-butoxy-1-propnol and the like.

The acid mentioned above is not particularly restricted provided that it can serve as a counter ion to the sulfonium group. Thus, there may be mentioned, for example, formic acid, acetic acid, lactic acid, propionic acid, boric acid, butyric acid, dimethylolpropionic acid, hydrochloric acid, sulfuric acid, phosphoric acid, N-acetylglycine, N-acetyl-β-alanine and the like.

The decomposition of the sulfonium group upon heating can be prevented by carrying out the sulfonium introduction after the carbon-carbon unsaturated bond introduction, as mentioned above.

An amine compound may be added to the above cationic electrocoating composition. The addition of the amine compound brings about increased conversion of the sulfonium group to a sulfide by electrolytic reduction during the electrodeposition process. Said amine compound is not particularly restricted but can include, for example, primary to tertiary mono- and polyfunctional aliphatic amines, alicyclic amines, aromatic amines and like amine compounds. Among these, water-soluble or water-dispersible ones are preferred. As such, there may be mentioned, for example, alkylamines containing 2 to 8 carbon atoms, such as monomethylamine, dimethylamine, trimethylamine, triethylamine, propylamine, diisopropylamine, tributylamine, etc.; monoethanolamine, diethanolamine, methylethanolamine, dimethyl-ethanolamine, cyclohexylamine, morpholine, N-methylmorpholine, pyridine, pyrazine, piperidine, imidazoline, imidazole, and the like. These may be used singly or two or more may be used combinedly. Among them, hydroxyamines, such as monoethanolamine, diethanol-amine and dimethylethanolamine, are preferred because of good aqueous dispersion stability.

Said amine compound can be incorporated directly in the above cationic electrocoating composition. In the case of conventional neutralization type amine-based cationic electrocoating compositions, the addition of a free amine deprives a neutralizing acid in the resin, whereby the stability of the electrolyte bath is markedly worsened. To the contrary, in the case of the above cationic electrocoating composition, no such bath stability disturbance is encountered.

The level of said amine compound added is preferably 0.3 to 25 millimoles per 100 g of the resin solid content of the above cationic electrocoating composition. When said level is below 0.3 millimole per 100 g, the effect resulting from the addition of the compound cannot be produced. The addition at a level above 25 millimoles per 100 g is uneconomical, since enhanced effect proportional to the high addition level cannot be expected. A more preferred range is 1 to 15 millimoles per 100 g.

In the above cationic electrocoating composition, said epoxy-based basic resin itself contains a curing group and therefore the use of a curing agent is not always necessary. For further improvement in curability, however, a curing agent may be used. As such curing agent, there may be mentioned, for instance, compounds having a plurality of at least one species of propargyl group and unsaturated double bond, for example compounds obtained by addition reaction of a propargyl-containing compound such as propargyl alcohol or an unsaturated double bond-containing compound such as (meth)acrylic acid or allyl alcohol to polyepoxides derived from novolak phenol or the like or to pentaerythritol tetraglycidyl ether or the like.

Said curing agent is preferably used in an amount of not more than 80% by weight relative to the resin solid content in the above cationic electrocoating composition. When such curing agent is used, it is preferred that the unsaturated bond content and the sulfonium group content in the curing agent be adjusted so as to fall within the respective ranges specified above for the above cationic electrodeposition coating composition.

In the above cationic electrocoating composition, a curing catalyst may be used for promoting the curing reaction between unsaturated bonds. Such curing catalyst is not particularly restricted but can include, for example, transition metals such as nickel, cobalt, copper, manganese, palladium and rhodium with a ligand such as cyclopentadiene or acetylacetone or a carboxylic acid such as acetic acid bound thereto. Among these, copper acetylacetone complex and copper acetate are preferred. The level of said curing catalyst added is preferably 0.1 to 20 millimoles per 100 g of the nonvolatile matter in the above cationic electrocoating composition.

The above cationic electrocoating composition may contain, when necessary, one or more other components in ordinary use in cationic electrocoating compositions. Said other components are not particularly restricted but can include, for example, pigments, pigment dispersing resins, surfactants, antioxidants, ultraviolet absorbers and other coating additives.

Said pigments are not particularly restricted but can include, for example, color pigments such as titanium dioxide, carbon black, iron oxide red, etc.; rust preventing pigments such as basic lead silicate, aluminum phosphomolybdate, etc.; extenders such as kaolin, clay, talc, etc., and other pigments in general use in cationic electrocoating compositions.

The level of said pigments added is preferably 0 to 50% by weight as solid matter in the above cationic electrocoating composition.

Said pigment dispersing resins are not particularly restricted but those pigment dispersing resins which are in general use can be used. Pigment dispersing resins containing sulfonium group and carbon-carbon unsaturated bond therein may also be used. Such pigment dispersing resins containing sulfonium group and unsaturated bond can be obtained, for example, by reacting a sulfide compound with a hydrophobic epoxy resin obtained by reacting a bisphenol type epoxy resin with a half-blocked isocyanate; or by reacting a sulfide compound with this resin in the presence of a monobasic acid and a hydroxyl-containing dibasic acid.

The above cationic electrocoating composition can be obtained by blending the epoxy-based basic resin mentioned above, as necessary, with the amine and other various components mentioned above, followed by dissolution or dispersion in water. In using cationic electrocoating, said composition is preferably prepared so that the nonvolatile matter may amount to 10 to 30% of the bath liquid. Further, it is preferably prepared so that the carbon-carbon unsaturated bond and sulfonium group contents may not deviate from the respective ranges mentioned above.

The top coating, another coating to be used for forming the multilayer coating film of the present invention, is not particularly restricted but may be any of those top coatings generally used for automobiles. Thus, it may be a solid color coating which is water base or solvent base one and is used as one-coat solid, or may consist of a base coating and a clear coating which can be applied by the two-coat one-bake coating method.

Said water-base solid color coating is not particularly restricted but may be, for example, a combination of an aqueous acrylic resin solution prepared by neutralizing a water-soluble or water-dispersible polymer compound (for example a hydroxyl- and carboxyl-containing acrylic resin) with an amine or the like, and a resin capable of reacting with said polymer compound (for example a water-soluble or water-dispersible amino resin or blocked isocyanate resin or the like).

Said solvent base solid color coating is not particularly restricted but may be, for example, a combination of one of various organic solvents, a polymer compound soluble therein (for example a hydroxyl-containing acrylic resin) and a compound capable of reacting with said polymer compound (for example an amino resin, polyisocyanate or blocked isocyanate or the like).

Said solid color coating contains a well known inorganic or organic color pigment such as carbon black, phthalocyanine blue or titanium dioxide. In addition, there may be incorporated one or more additives such as an extender, curing promoter, leveling agent, ultraviolet absorber, light stabilizer, etc.

The base coating mentioned above is not particularly restricted but may be, for example, a water base or solvent base one prepared by compounding the resin and color pigment components to be used in said solid color coating, together with one or more additives such as a curing agent, extender, curing catalyst, leveling agent, ultraviolet absorber, light stabilizer, etc. Said base coating may also be a metallic base coating with a known luster pigment such as aluminum flakes or mica flakes incorporated therein.

From the environment protection viewpoint, said solid color coating and base coating are preferably water base ones.

The clear coating mentioned above is not particularly restricted but may be, for example, a solvent base or water base one or a powder form one. From the viewpoint of environment protection, a water base or powder clear coating is preferred. The solvent base clear coating may be, for example, one of various organic solvents, a polymer compound soluble therein (for example a hydroxyl-containing acrylic resin or polyester resin), and a compound capable of reacting with said polymer compound (for example an amino resin, polyisocyanate or blocked isocyanate or the like); or a combination of a solvent, an acrylic resin having an acid anhydride group opened by half esterification and a compound having a hydroxyl and epoxy groups. The corresponding water base ones may also be used.

The powder form clear coating mentioned above may be substantially free of water or any organic solvent and may be, for example, a combination of a hydroxyl-containing acrylic resin or polyester resin and a compound capable of reacting with such polymer compound (for example an amino resin, polyisocyanate or blocked isocyanate or the line); or a combination of an epoxy-containing acrylic resin and a polybasic carboxylic acid or polybasic carboxylic acid anhydride or the like. In said clear coating, there may be incorporated any of the color pigments or luster pigments mentioned above at a level at which the transparency is not impaired. Furthermore, one or more additives such as a curing promoter, leveling agent, ultraviolet absorber and light stabilizer can be used.

For forming the multilayer coating film of the present invention, electrocoating is first carried out using the above cationic electrocoating composition and using, as an article to be coated, an electroconductive article such as an iron sheet, steel sheet or aluminum sheet, with or without surface treatment, or a shaped article derived therefrom. Said electrocoating is carried out by applying generally a voltage of 50 to 500 V, preferably 50 to 350 V between the article, which is the cathode, and the anode. When the voltage applied is below 50 V, the electrodeposition will proceed insufficiently. A higher voltage than 500 V means an increased electric power consumption and is uneconomical. When the above cationic electrodeposition coating composition is used and a voltage within the above range is applied, a uniform coat can be formed all over the article without any abrupt increase in film thickness during the electrodeposition process.

The electrodeposition process preferably comprises: (i) a step of immersing the article in the above cationic electrocoating composition, (ii) a step of causing a coat to deposit by applying a voltage between the article, which serves as the cathode, and the anode and (iii) a step of further applying a voltage on said deposit coat to thereby increase the electric resistance per unit volume of said coat. The period of voltage application depends on the electrodeposition conditions but, generally, it may be 2 to 4 minutes.

After completion of the above electrodeposition process, the coated article, either as such or after washing with water, is baked for curing at 100 to 200° C., preferably 140 to 180° C., for 10 to 30 minutes, to give a cationic electrodeposition coat.

Said cationic electrodeposition coat preferably has a thickness of 10 to 25 $\mu$m. If it is less than 10 $\mu$m, the rust preventing effect will be insufficient. If it exceeds 25 $\mu$m, the coating composition will be wasted. With the above cationic electrocoating composition, the coat formed by electrodeposition on the surface of the article is converted to a nonconductor by the electrolytic reduction reaction mentioned above, resulting in a great improvement in throwing power. Therefore, even when the coat thickness is within the above range, a uniform coat can be formed all over the coating target article and thus a sufficient rust preventing effect can be produced.

Then, onto the thus-obtained cationic electrodeposition coat, the above-mentioned top coating is applied and baked for curing to give a top coat, whereupon the multilayer coating film is completed. In forming said top coat using the above-mentioned solid color coating as the top coating, spray coating is preferably carried out to a dry coating film thickness of 30 to 100 $\mu$m. A plurality of coating procedures, for example two-stage coating, can also be performed. Said spray coating can be performed using an air spray coater, airless spray coater, air atomizing or rotary atomizing electrostatic coater. Said baking for curing may be carried out at 90 to 250° C., preferably 100 to 200° C., more preferably 120 to 180° C., for a period selected depending on the baking temperature.

In cases where the top coating consists of a base coating and a clear coating, the base coating is first applied preferably to a dry film thickness of 10 to 20 $\mu$m by spray coating using such a coater. In this coating step, the coating procedure may be repeated, as in two-stage coating. After coating with the base coating (after 2 to 10 minutes of preliminary drying at 60 to 120° C. in the case of coating with a water-base base coating), setting is effected for 2 to 5 minutes. Then, a clear coating is applied thereon preferably to a dry film thickness of 40 to 100 $\mu$m. With a powder coating composition, said coating can be carried out using a coater in which the electrostatic powder coating technique is utilized. Thereafter, both the base coat and clear coat are baked for curing at 90 to 250° C., preferably 100 to 200° C., more preferably 120 to 180° C., for a period selected depending on the baking temperature, to give a top coat.

It is also possible to employ the two-coat one-bake technique which comprises forming the uncured top coat on the obtained, uncured electrodeposition coat by applying the top coating in the so-called wet-on-wet manner, and then heating both the uncured coats simultaneously to give a multilayer coating film.

The thus-formed top coat has a light transmissivity of not less than 0.5% in the wavelength range of 300 to 420 nm. When it is less than 0.5%, the effects of the present invention cannot be obtained. The upper limit to said light transmissivity should not be particularly specified. Generally, however, the top coat has a decorative character and is required to mask the ground and, therefore, the light transmissivity is not more than 3%. Considering this, the upper limit to said light transmissivity is preferably set at 3% or below. In cases where a base coating and a clear coating are used as the top coating, it is necessary to determine the light transmissivity regarding the base coat and clear coat collectively as one top coat.

The thus-formed multilayer coating film of the present invention comprises the above-mentioned cationic electrodeposition coat and the above-mentioned top coat, wherein the cationic electrodeposition coat is one formed by using the above cationic electrocoating composition. Therefore, the phenomenon of peeling of the coating film at the interface between the cationic electrodeposition coat and the top coat will not occur even with the lapse of time.

The peeling phenomenon is considered to result from chalking of the coating film due to degradation, invasion of moisture through the site of chalking and the resulting lowering of the adhesion at the interface. The reason why such peeling phenomenon does not occur in the multilayer coating film of the present invention is not known for certain. It is presumable, however, that it is a result of trapping of radicals or active oxygen generated by light irradiation by the carbon-carbon unsaturated bond or the sulfonium group and the nonconductor version thereof occurring in the coating film.

As a result, the weather resistance of the electrodeposition coat itself is improved and, moreover, the ability to trap radicals generated in said coat can contribute to the prevention of photodegradation of the coating film as a whole. Thus, a multilayer coating film excellent in weather resistance can be formed.

BEST MODES FOR CARRYING OUT THE INVENTION

The following examples illustrate the present invention in further detail. These examples, however, are by no means limitative of the scope of the present invention.

PRODUCTION EXAMPLE 1
Production of a Sulfonium- and Propargyl-containing Bisphenol Epoxy Type Resin for Cationic Electrodeposition A separable flask equipped with a stirrer, thermometer, nitrogen inlet tube and reflux condenser was charged with 900.0 g of a bisphenol type epoxy resin with an epoxy equivalent of 450 (Epikote 1001 (trademark), product of Yuka Shell Epoxy), 448.0 g of propargyl alcohol and 3.0 g of dimethylbenzylamine, and the reaction was carried out by heating the mixture to 120° C. The reaction was allowed to proceed until disappearance of the epoxy group as evidenced by epoxy equivalent measurement by hydrochloric acid-dioxane method. Thereafter, the unreacted propargyl alcohol was completely distilled off using a vacuum pump. Then, 1,480.0 g of epichlorohydrin and 8.0 g of tetramethylammonium chloride were added, the temperature was raised to 50° C., 172.0 g of 50% aqueous sodium hydroxide solution was added dropwise over 2 hours and the reaction was further allowed to proceed for 5 hours while continuously removing the water as an azeotrope with epichlorohydrin under reduced pressure. The excess epichlorohydrin was distilled off under reduced pressure, toluene was added to the reaction product, and the sodium chloride formed by the reaction was completely removed by partition using water/toluene. The toluene was then distilled off under reduced pressure, to give the desired resin with an epoxy equivalent of 570 (theoretical value: 562). The yield was 88.0%.

Further, a separable flask equipped with a stirrer, thermometer, nitrogen inlet tube and reflux condenser was charged with 1,140 g of the resin obtained as mentioned above, 272.0 g of 1-(2-hydroxyethylthio)-2-propanol, 360.0 g of 50% aqueous solution of lactic acid and 108.0 g of deionized water, the temperature was raised to 75° C. and the reaction was carried out for 6 hours. After it was confirmed that the acid value was not more than 5, 137.2 g of deionized water was added to give the desired aqueous resin solution. This had a solid content of 70.2% by weight, and the sulfonium value was 71.0 mmol/100 g of varnish.

PRODUCTION EXAMPLE 2
Production of a Sulfonium- and Propargyl-containing Novolak Epoxy Type Resin for Cationic Electrodeposition A separable flask equipped with a stirrer, thermometer, nitrogen inlet tube and reflux condenser was charged with 1,663.5 g of a cresol novolak type epoxy resin with an epoxy equivalent of 200.4 (Epototo YDCN-701 (trademark), product of Toto Kasei), 510.5 g of propargyl alcohol and 5.0 g of dimethylbenzylamine, the temperature was raised to 125° C. and the reaction was carried out for 3 hours, to give a propargyl-containing resin with an epoxy equivalent of 1,580. Further, a separable flask equipped with a stirrer, thermometer, nitrogen inlet tube and reflux condenser was charged with 1,089.5 of the resin obtained as mentioned above, 99.0 g of 1-(2-hydroxyethylthio)-2,3-propanediol, 39.0 g of glacial acetic acid and 93.5 g of deionized water, the temperature was raised to 75° C. and the reaction was carried out for 6 hours. After it was confirmed that the acid value was not more than 5, 289.0 g of deionized water was added to give the desired resin solution. This had a solid content of 70% by weight, and the suffonium value was 30.0 mmol/100 g of varnish.

PRODUCTION EXAMPLE 3
Production of a Sulfonium- and Propargyl-containing Polybutadiene-based Resin for Cationic Electrodeposition A separable flask equipped with a stirrer, thermometer, nitrogen inlet tube and reflux condenser was charged with 1,000.0 g of epoxidized polybutadiene with an epoxy equivalent of 200 (Nisseki Polybutadiene E-1000-8 (trademark), product of Nippon Oil Co.) and 240.0 g of propargylic acid, the temperature was raised to 135° C. and the reaction was carried out for 3 hours. After it was confirmed that the acid value had reduced to zero, the mixture was cooled to 75° C., 219.6 g of thiodiethanol, 82.8 g of formic acid and 259.2 g of deionized water were added, and the reaction was carried out for 7 hours. After it was confirmed that the acid value was not more than 5, 268.1 g of deionized water was added to give the desired resin solution. This had a solid content of 69.8% by weight, and the sulfonium value was 56.9 mmol/100 g of varnish.

PRODUCTION EXAMPLE 4
Production of a Propargyl-containing Aliphatic Curing Agent A separable flask equipped with a stirrer, thermometer, nitrogen inlet tube and reflux condenser was charged with 655.0 g of pentaerythritol tetraglycidyl ether with an epoxy equivalent of 213 (Denacol EX411N (trademark), product of Nagase Chemicals), 315.5 g of propargylic acid and 1.0 g of dimethylbenzylamine, and the reaction was carried out by raising the temperature to 130° C. The reaction was allowed to proceed until disappearance of the epoxy group as evidenced by epoxy equivalent measurement by the hydrochloric acid-dioxane method, to give the desired product. This had a solid content of 89.0% by weight.

COMPARATIVE PRODUCTION EXAMPLE 1
Production of an Emulsion for Comparative Investigation A separable flask equipped with a stirrer, thermometer, nitrogen inlet tube and reflux condenser was charged with 1,900.0 g of a bisphenol type epoxy resin with an epoxy equivalent of 950 (Epikote 1004 (trademark), product of Yuka Shell Epoxy), which is obtained by reacting bisphenol A and epichlorohydrin in the presence of an alkali catalyst. After dissolution of said resin in 993 g of ethylene glycol monobutyl ether, 210 g of diethanolamine was added dropwise while maintaining the reaction system at 90° C. After completion of the dropping, the temperature was raised to 110° C. and the reaction was carried out for 1.5 hours to give a resin solution with a resin solid content of 68%. Then, a curing agent prepared by blocking diphenylmethanediisocyanate with ethylene glycol mono-2-ethylhexyl ether was admixed with the resin solution obtained as mentioned above at a solid weight ratio of (resin solution)/(curing agent)=75/25, and dibutyltin oxide was incorporated therein in an amount of 3% by weight. This resin composition (1,383 g, solid content 75%) was added to a mixed aqueous solution prepared in advance from 672 g of deionized water and 21 g of glacial acetic acid, the mixture was stirred for 1 hour using a high-speed rotary stirrer and, thereafter, 1,381.5 g of deionized water was added, whereby an aqueous solution having a solid content of 30% by weight was obtained and used as an emulsion for comparative investigation.

EXAMPLE 1

An electrocoating composition was prepared by using, as the basic resin, 742.8 g of the sulfonium- and propargyl-containing bisphenol epoxy type resin for cationic electrodeposition as obtained in Production Example 1 and adding thereto 308.5 g of the propargyl-containing aliphatic curing agent obtained in Production Example 4, 4.0 g of nickel acetylacetonate and 120.3 g of deionized water, stirring the mixture for 1 hour using a high-speed rotary mixer, and further adding 2,824.4 g of deionized water to give an aqueous solution with a solid content of 20% by weight.

EXAMPLE 2

An electrocoating composition was prepared by using, as the basic resin, 1,131.4 g of the sulfonium- and propargyl-containing novolak epoxy type resin for cationic electrodeposition as obtained in Production Example 2 and adding thereto 8.0 g of nickel acetylacetonate and 115.6 g of deionized water, stirring the mixture for 1 hour using a high-speed rotary mixer, and further adding 2,700.0 g of deionized water and adding 45.0 g of a 10% aqueous solution of N-methylethanolamine with stirring, to give an aqueous solution with a solid content of 20% by weight.

EXAMPLE 3

An electrocoating composition was prepared by using, as the basic resin, 742.8 g of the sulfonium- and propargyl-containing polybutadiene-based resin for cationic electrodeposition as obtained in Production Example 3 and adding thereto 4.0 g of nickel acetylacetonate, 310.1 g of the propargyl-containing aliphatic curing agent obtained in Production Example 4 and 154.7 g of deionized water, stirring the mixture for 1 hour using a high-speed rotary mixer, and further adding 2,788.4 g of deionized water, to give an aqueous solution with a solid content of 20% by weight.

COMPARATIVE EXAMPLE 1

An electrocoating composition was prepared by adding 1,333 g of deionized water to 2,667 g of the emulsion for comparative investigation as obtained in Comparative Production Example 1 with stirring to give an aqueous solution with a solid content of 20% by weight.

Evaluation (1) Paint Film Production

Using the electrocoating compositions prepared in the examples and comparative example and setting the bath temperature at 25° C., electrocoating was carried out at 250 V for 3 minutes respectively with a zinc phosphate-treated cold rolled steel sheet (JIS G 3141 SPCC-SD, treated with Surfdine SD-5000 (trademark), product of Nippon Paint) as the cathode and a stainless steel container as the anode. Each coated sheet was pulled out of the electrodeposition bath, washed with water and baked at 175° C. for 20 minutes, to thereby form an electrodeposition coat on the coating target article.

The thus-obtained coated articles were air-cooled to room temperature and then further coated, on the electrodeposition coats obtained as mentioned above, with a silver-colored solvent-base metallic coating (melamine curing type acrylic resin-based metallic coating) to a dry film thickness of 15 $\mu$m by means of an air spray at 23° C. Thereafter, a solvent-base clear coating (melamine curing type acrylic resin-based clear coating) was applied to a dry film thickness of 40 $\mu$m by the electrostatic spraying technique. The thus-obtained coated articles were placed in a baking/drying oven set at 140° C. and subjected to baking treatment for 30 minutes, whereby a multilayer coating film was obtained on each steel sheet. The light transmissivity of the top coat obtained was 1.0% in the wavelength range of 300 to 420 nm.

The light transmissivity was measured in the following manner.

Each free film comprising the coating film alone as excised from each test specimen was set on the holder (the distance from the light-receiving portion adjusted to 3 mm or less) of a U-3200 spectrophotometer (product of Hitachi) with the wavelength width set at 6 nm or less and the total range of wavelength at 300 to 420 nm, and measurement was performed. The light transmissivity in the specified wavelength range was calculated from the thus-obtained transmissivity curve as follows:

Light transmissivity (%)=[integrated value of transmissivity curve in specified wavelength range/integrated value of transmissivity curve at 100% transmittance in specified wavelength range]×100.

(2) Evaluation of Interlayer Adhesion of Multilayer Coating Films

Test specimens prepared from the steel sheets with the respective multilayer coats formed thereon as mentioned above using the electrocoating compositions of the examples and comparative example by providing them with rust preventive seals on the back and edge portions were exposed to light irradiation for 300 hours in a sunshine weather meter (product of Suga Shikenki) set at a temperature of 60° C. and, then, placed for 20 hours in a constant-temperature, constant-humidity vessel set at a temperature of 50° C. and a humidity of not less than 95% RH. This exposure-standing test cycle was repeated 5 times. After completion of the test, the interlayer adhesion was evaluated in the following manner.

Thus, a checker pattern was drawn on each coating film by drawing 11 parallel lines lengthwise and breadthwise at intervals of 2 mm using a cutter knife to give 100 cells, an adhesive cellophane tape was tightly applied thereto and abruptly peeled off toward the tester at an angle of 45°. The surface state and peeling state of the coating film on that occasion were examined and evaluated according to the following criteria. When the criterion O was met, the coating film was judged as satisfactory. The results thus obtained are shown in Table 1.

○: No abnormality of coating film nor peeling.
×: Abnormality and peeling found on coating film.

(3) Gloss Retention Measurement of Electrodeposition Coats

The 60° gloss of each steel sheet with the electrodeposition coat formed thereon using each of the electrocoating compositions of the examples and comparative example was measured as the initial gloss using a glossmeter (product of Suga Shikenki). Further, this coat, without formation of any top coat, was exposed to light irradiation for 1,800 hours in a sunshine weather meter (product of Suga Shikenki) for accelerated exposure of the electrodeposition coat. Thereafter, the 60° gloss of the coating film after accelerated exposure was measured as post-degradation gloss in the same manner as mentioned above, and the gloss retention was calculated using the formula shown below. When the gloss retention was not less than 90%, the coating film was regarded as satisfactory. The results thus obtained are shown in Table 1.

Gloss retention (%)=(post-degradation gloss/initial gloss)×100

TABLE 1

| | Interlayer adhesion | Gloss retention (%) |
| --- | --- | --- |
| Example 1 | ○ Good, no abnormality | 95.5 |
| Example 2 | ○ Good, no abnormality | 94.5 |
| Example 3 | ○ Good, no abnormality | 98.0 |
| Comparative Example 1 | × Peeling all over the Surface | 14.5 |

From the examples, it was revealed that the multilayer coating films of the present invention can display sufficient weather resistance even when a top coat showing a light transmissivity of 1.0% in the wavelength range of 300 to 420 nm was used.

EFFECTS OF THE INVENTION

The multilayer coating film of the present invention, which has the constitution mentioned above and the electrodeposition coat of which shows high weather resistance, can secure sufficient weather resistance in automotive coatings despite no intermediate coat, without causing the phenomenon of interfacial peeling between the top coat and the electrodeposition coat. In particular, it is highly effective in those cases where the top coat is a solid color coat using a bluish color pigment or is a combination of a metallic coat using a silver metallic color pigment and a clear coat, in which the intermediate coat cannot be omitted because of intense photodegradation of these coats. Therefore, the two-coat coating, which is highly economical due to the omission of the intermediate coating step and which has so far been conducted only for a narrow range of car species and of coating colors due to weather resistance problems, can now be practiced using a wide range of coating colors, inclusive of metallic coat colors. This furthermore makes it possible to apply said coating to a wide range of car species and is very advantageous from the industrial viewpoint.

We claim:
1. A multilayer coating film which comprises:
a cationic electrodeposition coat formed from an epoxy-based cationic electrocoating composition containing 5 to 300 millimoles of sulfonium group and 50 to 2,000 millimoles of carbon-carbon unsaturated bond per 100 g of the resin solid content, with carbon-carbon triple bond accounting for at least 15% of said carbon-carbon unsaturated bond; and
a top coat formed thereon.
2. The multilayer coating film as claimed in claim 1, wherein the top coat has light transmissivity of not less than 0.5% in the wavelength range of 300 to 420 nm.
3. The multilayer coating film as claimed in claim 1, wherein the top coat is a solid color coat.
4. The multilayer coating film as claimed in claim 1, wherein the top coat consists of a base coat and a clear coat.
5. The multilayer coating film as claimed in claim 4, wherein the base coat is a metallic base coat.
6. The multilayer coating film as claimed in claim 2, wherein the top coat is a solid color coat.
7. The multilayer coating, film as claimed in claim 2, wherein the top coat consists of a base coat and a clear coat.

* * * * *